US012744752B2

(12) United States Patent
Loehrlein et al.

(10) Patent No.: US 12,744,752 B2
(45) Date of Patent: Sep. 22, 2026

(54) MESSAGE QUEUE TELEMETRY TRANSPORT (MQTT) DATA LOGGER AND PROCESSOR FOR NEAR REAL TIME DATA ANALYSIS

(71) Applicant: The United States of America, as Represented by the Secretary of the Navy, Crane, IN (US)

(72) Inventors: Ryan Loehrlein, Bloomington, IN (US); Andrew Martin, Indianapolis, IN (US); Sondra Lynn, Madison, AL (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/790,502

(22) Filed: Jul. 31, 2024

(65) Prior Publication Data

US 2025/0047628 A1 Feb. 6, 2025

Related U.S. Application Data

(60) Provisional application No. 63/529,945, filed on Jul. 31, 2023.

(51) Int. Cl.
*H04L 51/214* (2022.01)
*H04L 69/08* (2022.01)
*H04L 69/22* (2022.01)

(52) U.S. Cl.
CPC ............ *H04L 51/214* (2022.05); *H04L 69/08* (2013.01); *H04L 69/22* (2013.01)

(58) Field of Classification Search
CPC ....... H04L 51/214; H04L 69/08; H04L 69/22; H04L 67/12; H04L 67/565
See application file for complete search history.

(56) References Cited

U.S. PATENT DOCUMENTS 12,242,892 B1 * 3/2025 Burnett ............... G06F 9/45533
2017/0163734 A1 * 6/2017 Basu ....................... H04L 67/12
2017/0180214 A1 * 6/2017 Azevedo .............. H04L 43/067
(Continued)

OTHER PUBLICATIONS

M. Singh, M. A. Rajan, V. L. Shivraj and P. Balamuralidhar, "Secure MQTT for Internet of Things (IoT)," 2015 Fifth International Conference on Communication Systems and Network Technologies, Gwalior, India, 2015, pp. 746-751 (Year: 2015).*
(Continued)

*Primary Examiner* — Chris Parry
(74) *Attorney, Agent, or Firm* — Naval Surface Warfare Center, Crane Division; Patrick B. Law

(57) ABSTRACT

Disclosed is an MQ Telemetry Transport (MQTT) Data Logger and Processor for Near Real Time Data Analysis that is configured to subscribe to a Machine-to-Machine (M2M) network protocol and store all the messages sent to an MQTT broker. Once all of the messages have been logged, the presently disclosed invention further features cleans and places the data into a format that is usable or accessible by modeling and simulation (M&S) tool suites, as one example. These aspects can be utilized by test and evaluation (T&E) engineers to rapidly evaluate system characteristics and performance. Moreover, the disclosed methodology can be used to augment technical data within M&S scenarios for verification and validation (V&V) and post processing.

17 Claims, 4 Drawing Sheets

(56) References Cited

U.S. PATENT DOCUMENTS

| | | | | |
|---|---|---|---|---|
| 2022/0019199 | A1* | 1/2022 | Mazur | G05B 19/41835 |
| 2023/0412696 | A1* | 12/2023 | Sandler | H04L 67/34 |

OTHER PUBLICATIONS

J. Dahmann, A. Khaw, I. Biloiu, R. Jacobs, C. Kim and C. Thompson, “Digital Engineering of Large Scale System of Systems: End-to-End (E2E) Modeling and Analysis Environment,” 2021 16th International Conference of System of Systems Engineering (SoSE), Västerås, Sweden, 2021, pp. 120-125 (Year: 2021).*

* cited by examiner

MESSAGE QUEUE TELEMETRY TRANSPORT (MQTT) DATA LOGGER AND PROCESSOR FOR NEAR REAL TIME DATA ANALYSIS

CROSS-REFERENCE TO RELATED APPLICATIONS

The present application claims the benefit of U.S. Provisional Patent Application Ser. No. 63/529,945, filed Jul. 31, 2023, and entitled "MQ TELEMETRY TRANSPORT (MQTT) DATA LOGGER AND PROCESSOR FOR NEAR REAL TIME DATA ANALYSIS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 211348US01) is assigned to the United States Government and is available for licensing for commercial purposes. Licensing and technical inquiries may be directed to the Technology Transfer Office, Naval Surface Warfare Center Crane, email: Crane_T2@navy.mil.

FIELD

The present disclosure generally relates to message queue telemetry transport (MQTT) data logging and processing, and more particularly to apparatus and methods for effecting an MQTT data logger and processor that affords near real time data analysis, especially for machine-to-machine (M2M) network protocol.

BACKGROUND

MQTT is a publish-and-subscribe, machine to machine (M2M) network messaging protocol for message queue (MQ)/message queuing service and is an open OASIS standard and an ISO recommendation (ISO/IEC 20922). In some aspects, the protocol is designed for implementing connections with remote devices having resource constraints or limited network bandwidth. The protocol is run over a transport protocol that provides ordered, lossless, bi-directional connections such as with Transmission Control Protocol/Internet Protocol (TCP/IP). In further aspects, MQTT is a bi-directional communication protocol.

MQTT employs software, firmware, and/or hardware termed an "MQTT broker" that receives MQTT messages from network clients and then routes the messages to appropriate destination clients. An MQTT client is any device that runs an MQTT library and connects to the MQTT broker over a network. In operation, the broker acts as a type of distributor wherein MQTT clients do not have a direct connection address of the intended recipient, but instead use the subject line called "Topic" that is populated by a particular topic terms or descriptor. Anyone who subscribes receives a copy of all messages for that topic. Multiple clients can subscribe to a topic from a single broker (one to many capability), and a single client can register subscriptions to topics with multiple brokers (many to one).

Each client can both produce and receive data by both publishing and subscribing, which is beneficial for sharing data and managing and controlling devices. A client cannot broadcast the same data to a range of topics, and must publish multiple messages to the broker, each with a single topic given. With the MQTT broker architecture, the client devices and server application become decoupled such that clients are kept unaware of each other's information. The broker also keeps track of all the session's information as a device state toggles between on and off in a function termed "persistent sessions." In this state, a broker will store both connection info for each client, topics each client has subscribed to, and any messages for a topic with a QoS of 1 or 2.

An MQTT broker is beneficial in that it may (1) eliminate vulnerable and insecure client connections; (2) enable scaling from a single device to many devices; (3) manage and tracks all client connection states, including security credentials and certificates; and/or (4) reduce network strain without compromising the security.

For some systems, known MQTT brokers do not provide a mechanism to save any of the messages that are sent across the M2M network protocol into the MQTT brokers. Accordingly, there is a need for apparatus and methods that afford subscription to an MQTT broker and logging of all of the messages that are published.

SUMMARY

The present disclosure provides a Digital Mission Engineering (DME) MQ Telemetry Transport (MQTT) Data Logger and Processor for Near Real Time Data Analysis that is configured to subscribe to a Machine-to-Machine (M2M) network protocol and store all the messages sent to an MQTT broker. Once all of the messages have been logged, the presently disclosed invention further features software or instructions (e.g., a MATLAB script) that are executed to clean and place the data into a format that is ingestible by Modeling and Simulation (M&S) Tool Suites. These aspects of the presently disclosed invention can be utilized by test and evaluation (T&E) engineers to rapidly evaluate system characteristics and performance. Moreover, the disclosed methodology can be used to augment technical data within M&S scenarios for verification and validation (V&V) and post processing.

In aspects, a method for message queue telemetry transport (MQTT) data logging and processing is disclosed. The method includes storing one or more messages sent to an MQTT broker over a machine-to-machine (M2M) network in a data logging node communicatively coupled to the MQTT broker, the one or more messages configured according to MQTT network protocol. Further, the method includes cleaning the one or more messages stored in the data logging node according to one or more predetermined processes, and converting the cleaned one or more messages into another data format different from MQTT network protocol that is accessible by another system.

According to another aspect, another method for MQ Telemetry Transport (MQTT) data logging and processing is disclosed. The method includes logging all data and messages receivable by an MQTT broker from one or more clients over a communication network. Further, the method includes sorting and correcting the logged data and messages to generate cleaned logged data and messages, and converting the cleaned logged data and messages into another data format usable by another system.

In yet another aspect, an apparatus for MQ Telemetry Transport (MQTT) data logging and processing is disclosed. The apparatus includes a processor coupled to at least one memory device and a data logger module coupled with the processor and an MQTT broker. The data logger module includes a data flow module configured to store one or more messages sent to the MQTT broker over a machine-to-machine (M2M) network, wherein the one or more messages are configured according to MQTT network protocol, and a message sorter module configured to sort and clean the one or more messages stored in the data logging node according to one or more predetermined processes. Also, the data logger module is further configured to convert the cleaned one or more messages into another data format different from MQTT network protocol that is accessible by another system.

According to still one more aspect, a non-transitory computer-readable medium storing computer executable code is disclosed wherein the code when executed by at least one processor causes the at least one processor to (1) store one or more messages sent to an MQTT broker over a network, the one or more messages configured according to MQTT network protocol; (2) clean the one or more stored messages according to one or more predetermined processes; and (3) convert the cleaned one or more stored messages into another data format apart from MQTT network protocol that is accessible by another system.

BRIEF DESCRIPTION OF THE DRAWINGS

The detailed description of the drawings particularly refers to the accompanying figures in which.

DETAILED DESCRIPTION

Figure 1:
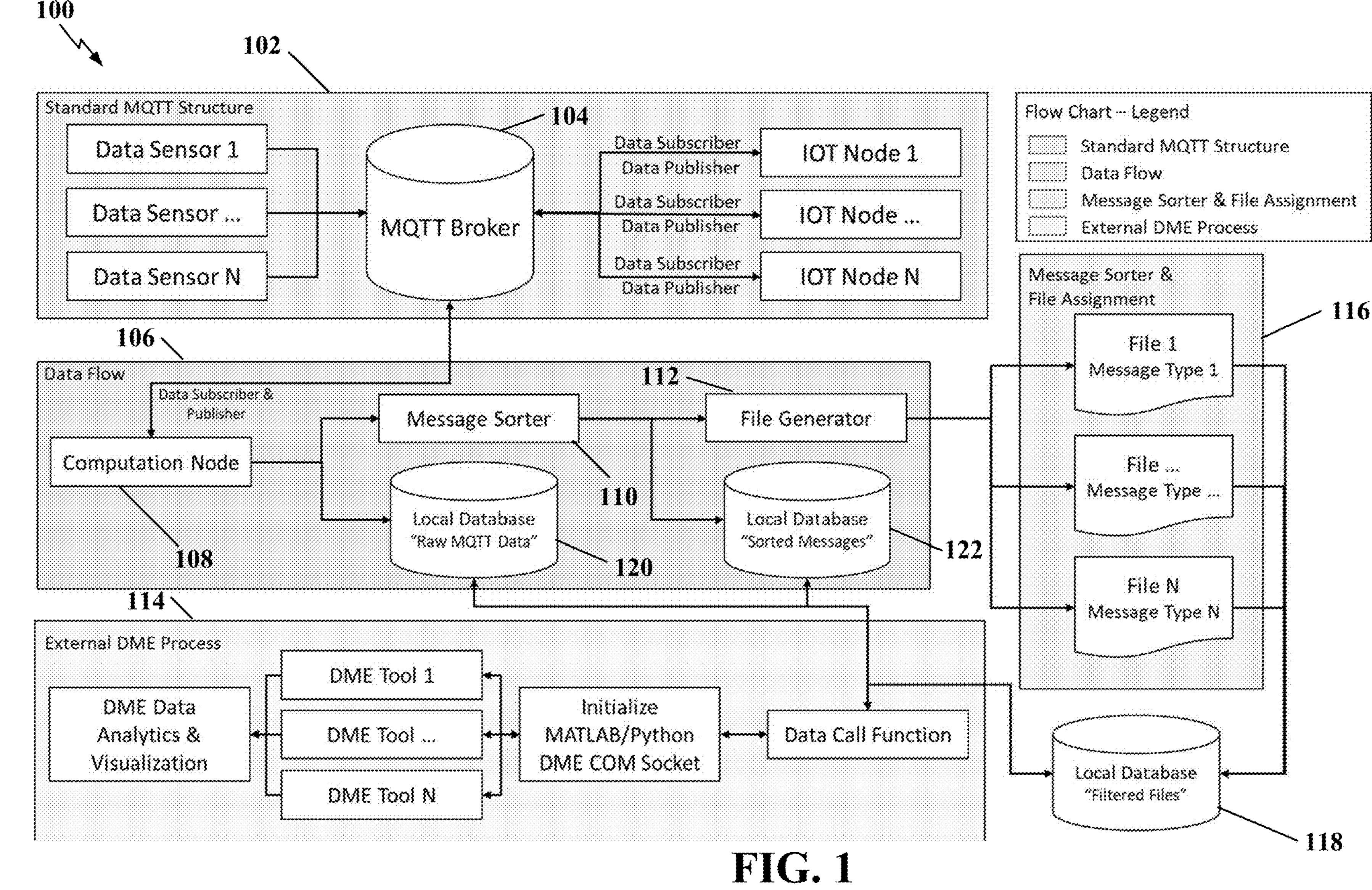
FIG. 1 shows an architecture and/or flow diagrams that employs MQTT message sorting and file assignment according to aspects of the present disclosure.

The embodiments and/or examples of the presently disclosed invention described herein are not intended to be exhaustive or to limit the present invention to the precise forms disclosed. Rather, the embodiments and/or examples selected for description have been chosen to enable one skilled in the art to practice the inventive concepts.

The presently disclosed methods and apparatus provide the ability to subscribe to an MQTT broker and log all of the messages that were published. Furthermore, the present disclosure describes the use of an algorithm, software, code, or script (e.g., a MATLAB script) that parses both uniform as well as non-uniform messages, sorts the data based on its header information, and formats the data into a readable format for various M&S tools.

The present apparatus and methods are different from current approaches because MQTT brokers do not provide a mechanism to save any of the messages that are sent across the Machine to Machine (M2M) network protocol into an MQTT broker. There exist technical capabilities that reroute information to a SQL database, but those still require a user to download, parse, clean, and sort the data for processing by the M&S tool suite. The methodology described herein allows a user to automatically collect, parse, clean, and create files that can be ingested easily by M&S tools. No knowns tools previously exist that integrate all of these features into a singular tool, apparatus, software, algorithm, or script to accomplish the present methodology.

As alluded to above, the MQTT protocol defines two types of network entities: (1) a message broker, and (2) one or more number of clients. An MQTT message broker (or simply "MQTT broker") is a server or similar device that receives messages from the clients and then routes the messages to the appropriate destination clients. An MQTT client is any device on a network that runs an MQTT library and connects to an MQTT broker over a network (e.g., a TCP/IP network). Furthermore, MQTT information is organized within a hierarchy of topics. When a publisher has new information data to distribute, it sends a control message with the data to the MQTT broker. In turn, the MQTT broker distributes the information to any clients that have subscribed to that topic. The publisher does not need to have any data on the number or locations of subscribers, and subscribers, in turn, do not have to be configured with any data about the publisher.

Furthermore, an MQTT broker is typically software running on a computer (e.g., running on-premises or in the cloud), and may be self-built or hosted by a third party. The MQTT broker acts as a type of "post office," where MQTT clients do not use a direct connection address of the intended recipient, but rather use the subject line called "Topic." Any client that subscribes to the topic receives a copy of all messages for that topic. Multiple clients can subscribe to a topic from a single MQTT broker (one-to-many capability), and a single client can register subscriptions to topics with multiple brokers (many-to-one).

In the present system, a Digital Mission Engineering (DME) MQTT Data Logger and Processor for Near Real Time Data Analytics is provided in order to afford advanced insights for decision makers. FIG. 1, in particular, illustrates an architecture and flow diagram 100 of the present apparatus, methods, or processes. As may be seen in FIG. 1, a standard MQTT structure 102 is utilized with an MQTT broker 104. Furthermore, a data flow 106 employs the use of a computation node 108, a message sorter 110, and a file generator 112 in communication with the MQTT broker 104 to obtain message of data subscribers and publishers. Additionally, an external DME processes/tool suite 114 is communicatively coupled via a data call function to the data flow 106, and raw MQTT data and sorted messages (stored by message sorter 110).

FIG. 1 further illustrates that the system and/or process flow employs MQTT message sorting and file assignment at 116 that sorts messages from file generator 112 by message types and stores the sorted messages in a database 118, which contain filtered files. The present processes illustrated in FIG. 1, in particular, afford the ability to process, sort, filter, and generate files that can be ingested by the DME processes/tool suite 114 (or equivalent tool suites or applications). This is performed by establishing the communicative connection with the MQTT data broker 104 as illustrated by the illustrated coupling between broker 104 and node 108. In aspects, a script, such as a Python script, may be implemented to listen to all messages that were sent across the Machine to Machine (M2M) network protocol. It is important to note that a Python script is capable of subscribing to both an encrypted and unencrypted M2M network. Once the script is live, it actively listens to all of the data flowing into the MQTT broker 104 and subscribes to all of the data streams. These data streams typically contain Extensible Markup Language (XML) or JavaScript Object Notation (JSON) messages.

Once the messages are stored (e.g., stored in a local database 120 as "Raw MQTT data") the data may be "cleaned" (e.g., via message sorter 110 and stored in a local database 122 with "sorted messages") and an external script (e.g., MATLAB/Python) is initialized to push the recorded information into data that is recognized by DME processes/tool suites 114. Overall, this process is unique because it connects the MQTT broker 102 to the DME architecture (e.g., 114) for near-real time data analytics. Within the DME domain (e.g., academic, industry, and government), near-real time modeling and simulation (M&S) is extremely challenging, thus making the present inventive concepts particularly beneficial.

In a particular application, the presently disclosed invention may utilize an agile M&S approach to rapidly model and simulate various scenarios such as Robotic Experimentation Prototyping for Maritime Unmanned Systems (REPMUS), as merely one example. In this case, a Linux OS may be leveraged to build a MQTT data logger that interconnects into the REP (MUS) Common Operating Picture (COP). MQTT, however, is a lightweight, publish-subscribe, M2M network protocol (similar to Internet of Things) and is not designed to be logged. Due to this limitation, a custom Python script is implemented in the presently disclosed system to enable authentication of the device (i.e. Linux Machine) with the appropriate encryption/client keys, subscribe to the data server, and setup an MQTT broker on the Linux device.

Further, data logs may be transferred over to a research, development, test, and evaluation (RDT&E) asset with a data parsing script via MATLAB configured to read, understand, and pull the correct MQTT subscriber information out of the log files and into the MATLAB workspace. This process may be challenging as large numbers of messages (e.g., >500K) may need to be sorted into a more easily workable table, for example. When the messages are ingested into MATLAB, the script may be configured to "clean" the logged files by scanning through each message for any "not a number" (NaNs), infinity (INFs), or zeros. These messages may then be corrected in one example to clean out the NaN, INFs, or zeros.

When the data is properly formatted in a MATLAB table, calls may be made to appropriate MATLAB system tool kit (STK) interface scripts to load the logged data into the STK. This allows a user to virtually recreate anything going on in a scenario (e.g., REPMUS) within the given digital environment.

In parallel to the processes described above, concept of operations (CONOP) documentation may be utilized to create vignettes inside of the STK. This process affords both a simulated vignette and the "ground truth" data recordings in one environment. The flow diagram FIG. 1 illustrates an outline of how the data is to be collected, parsed, and analyzed for near real-time analytics and visualization.

Furthermore, the flow diagram illustrated by FIG. 1 outlines that data is collected, parsed, and analyzed for near real-time analytics and visualization. The only section of the flow in FIG. 1 that is standard within the industry is the "standard MQTT structure" 102, which implements known methodology to publish and subscribe to the data flow. All of the remaining blocks (e.g., 106, 114, and 116, and 118) were presently developed and are new architecture/processes to further augment current M&S tools.

The following code in TABLE 1 below illustrates a non-limiting exemplary Python script that may be used to automate the "Data Flow" (e.g., block 106) including the "Message Sorter& File Augmentation" (e.g., Sorter 110 and file generator 112) portion of the flow diagram in FIG. 1.

TABLE 1

```
# Description: This script is designed to subscribe and log
any files that come across the MQTT
Broker
import paho.mqtt.client as mqtt
import sys
import socket
import ssl
import time
import datetime
# The broker, ca, and client files are loaded into the following file
configurations within the loggers cript.
# $ tree .
# .
#   |--- broker
#   |   |--- broker.crt
#   |   |---- broker.key
#   |--- ca
#   |   |--- ca.crt
#   |   |--- ca.key
#   |   |---- ca.srl
#   |---- client
#       |--- client.crt
#       |---- client.key
# The paths to add the files is located below:
ca = "/home/pi/ca.crt"
cert = "/home/pi/clientUS.crt"
private = "/home/pi/clientUS.key"
tls_version = 2
# TLS is a crypto protocol designed to provide communication
security over the network.
# When setting up this script configure the minimum version of
the TLS protocol to be used
# for this listener. Possible values are tlsv1.3, tlsv1.2 and tlsv1.1,
but not limited to such. If left unset,
# the default of allowing TLS v1.3 and v1.2.
def on_connect(client, userdata, flags, rc):
   print("Connected with result code " + str(rc))
   # Subscribing in on_connect( ) means that if we lose the connection
   #and reconnect then subscriptions will be renewed.
   client.subscribe([("I2I/#", 1), ("i212/#", 1), ("catl/#", 1), ("$SYS/#",1)])
def on_message(client, userdata, message):
   print("Message received: " + message.topic + " : " + str(message.pay-
load))
   if message.topic.startswith('I2I') == True:
      with open('/home/pi/I2I_Logs.txt', 'a+') as f:
         f.write(message.topic + " : " + str(message.payload) + "\n")
   elif message.topic.startswith('catl') == True:
      with open('/home/pi/catl_Logs.txt', 'a+') as f:
         f.write(message.topic + " : " + str(message.payload) + "\n")
   elif message.topic.startswith('i2i2') == True:
      with open('/home/pi/i2i2_Logs.txt', 'a+') as f:
         f.write(message.topic + " : " + str(message.payload) + "\n")
   elif message.topic.startswith('$SYS') == True:
      with open('/home/pi/SYS_Logs.txt', 'a+') as f:
         f.write(message.topic + " : " + str(message.payload) + "\n")
# broker_address = "localhost" # Broker address enable for
      from initial object
# port = 1883 # Broker port enable from initial object.
# Port 8883 is the standard port for encrypted MQTTS
# connections for unencrypted MQTT connections it is 1883.But you
# can use any port as long as you use the same port for clients.
broker_address = 'XX.XXX.XXX.XX'
port = 8883
# user = "yourUser"          #Connection username
# password = "yourPassword"          #Connection password
# client.username_pw_set(user, password=password)
# set username and password
client = mqtt.Client( ) # create new instance
# Publishing Certifications by adding broker/server CA key to the client
client.tls_set(ca_certs = ca, certfile = cert, keyfile =
private, tls_version=tls_version,
cert_reqs=ssl.CERT_NONE)
client.on_connect = on_connect # attach function to callback
client.on_message = on_message # attach function to callback
client.connect(broker_address, port=port) # connect to broker
client.loop_forever( )
```

The following TABLE 2 illustrates an example of script or instructions for converting MQTT messages and/or data into a readable format for an M&S tool suite.

TABLE 2

```
clear all; close all; clc %#ok<CLALL>
% The following script is designed to import, read, sort, and create dynamic
% variables. The dynamic variables will then be utilized to create STK
% External Files (example, .a, .e, .tle, .tlc, .mdl, .dae and many more).
% These files are utilized to control various object parameters/properties.
%% Begin Data Importing Process
% When data is imported into MATLAB, the variable names (i.e. Column Header
% will be modified if they contain invalid properties (i.e. spaces, dashes,
% forward slashes, or back slashes). These variables will then be
% manipulated and classified under the appropriate variable style, however,
% the original names will be save in the Variable Descriptions property.
% The data that is being ingested is MQTT data streams.
% MQTT may be run over
% a transport protocol that provides ordered, lossless, bi-directional
% connections-typically, TCP/IP. It is an open OASIS standard and an ISO
% recommendation (ISO/IEC 20922).
% the readtable function determines the file format from the file extension creates a table by
% reading column oriented data from a file. This is utilized since all of the information being ingested
% from the MQTT messages are XML or JSON formatted.
CMRE_LOG = readtable(strcat('C:\Users\XXXX \Desktop\',...
  'XXXX_logs'));
ITA_LOG = readtable(strcat('C:\Users\ryan.s.loehrlein\Desktop\',...
  'XXX_Logs'));
% An example of the message stream is shown below, however, it is important to note that the
% the data is not always in the same format. The python script, shown in the previous section, is
% designed to place similar messages into a single file so MATLAB can parse the data into
% the appropriate data provider:
        catl/cmre/cmre.alliance/STATUS : b'{"header": {"message_type": "STATUS", "source":
        "cmre.alliance", "time_sent": "2022-09-16T10:30:12.001130+00:00"}, "body": {"id":
        "cmre.alliance", "status": "BUSY", "location": {"horizontal": {"latitude": 38.432425,
        "longitude": -9.104578}, "vertical": {"altitude": 23.3}}, "owned_tasks": [ ], "capabilities":
        [ ]}}'
        catl/ita_navy/ita_navy.asv300/STATUS: b'{"header": {"message_type": "STATUS",
        "source": "ita_navy.c2sxmus", "time_sent": "2022-09-16T10:30:39.401661+00:00"}, "body":
        {"id": "ita_navy.asv300", "status": "BUSY", "location": {"latitude": 38.355771, "longitude":
        -9.051305}, "capabilities": [ ], "owned_tasks": [ ]}}'
% When recording the MQTT data stream the entire message was logged. This
% resulted in unusual table headers that need to be adjusted so the
% variables can be called properly. The section of code below will rename
% all of the column headers. It is important to note that this entire section, shown below,
% can be automated
ITA_LOG = renamevars(ITA_LOG, 1, 'Subscriber_Path');
ITA_LOG = renamevars(ITA_LOG, 2, 'Header');
ITA_LOG = renamevars(ITA_LOG, 3, 'Message_Type');
ITA_LOG = renamevars(ITA_LOG, 4, 'STATUS');
ITA_LOG = renamevars(ITA_LOG, 5, 'SOURCE');
ITA_LOG = renamevars(ITA_LOG, 6, 'PLATFORM');
ITA_LOG = renamevars(ITA_LOG, 7, 'TIME_X');
ITA_LOG = renamevars(ITA_LOG, 8, 'TIME_DATA');
ITA_LOG = renamevars(ITA_LOG, 9, 'BODY_X');
ITA_LOG = renamevars(ITA_LOG, 10, 'ID_X');
ITA_LOG = renamevars(ITA_LOG, 11, 'ID_DATA');
ITA_LOG = renamevars(ITA_LOG, 12, 'SATUS2');
ITA_LOG = renamevars(ITA_LOG, 13, 'BUSY');
ITA_LOG = renamevars(ITA_LOG, 14, 'LOCATION_X');
ITA_LOG = renamevars(ITA_LOG, 15, 'LATITUDE_X');
ITA_LOG = renamevars(ITA_LOG, 16, 'LATITUDE_DATA');
ITA_LOG = renamevars(ITA_LOG, 17, 'LONGITUDE_X');
ITA_LOG = renamevars(ITA_LOG, 18, 'LONGITUDE_DATA');
ITA_LOG = renamevars(ITA_LOG, 19, 'CAPABILITIES');
ITA_LOG = renamevars(ITA_LOG, 20, 'NULL_X');
ITA_LOG = renamevars(ITA_LOG, 21, 'OWNED_TAKS');
ITA_LOG = renamevars(ITA_LOG, 22, 'MISC');
CMRE_LOG = renamevars(CMRE_LOG,1, 'SUBSCRIBER_PATH');
CMRE_LOG = renamevars(CMRE_LOG,2, 'MISC1');
CMRE_LOG = renamevars(CMRE_LOG,3, 'HEADER_X');
CMRE_LOG = renamevars(CMRE_LOG,4, 'MESSAGE_TYPE');
CMRE_LOG = renamevars(CMRE_LOG,5, 'MSG_STATUS');
CMRE_LOG = renamevars(CMRE_LOG,6, 'MSG_SOURCE');
CMRE_LOG = renamevars(CMRE_LOG,7, 'MSG_ID');
CMRE_LOG = renamevars(CMRE_LOG,8, 'TIME_SENT');
CMRE_LOG = renamevars(CMRE_LOG,9, 'TIME');
CMRE_LOG = renamevars(CMRE_LOG,10, 'BODY');
CMRE_LOG = renamevars(CMRE_LOG,11, 'BODY_ID');
CMRE_LOG = renamevars(CMRE_LOG,12, 'BODY_TYPE');
CMRE_LOG = renamevars(CMRE_LOG,13, 'BODY_STATUS');
CMRE_LOG = renamevars(CMRE_LOG,14, 'BODY_BUSY');
CMRE_LOG = renamevars(CMRE_LOG,15, 'LOCATION');
CMRE_LOG = renamevars(CMRE_LOG,16, 'HORIZONTAL');
CMRE_LOG = renamevars(CMRE_LOG,17, 'LATITUDE');
```

TABLE 2-continued

```
CMRE_LOG = renamevars(CMRE_LOG,18, 'LAT_DATA');
CMRE_LOG = renamevars(CMRE_LOG,19, 'LONGITUDE');
CMRE_LOG = renamevars(CMRE_LOG,20, 'LONG_DATA');
CMRE_LOG = renamevars(CMRE_LOG,21, 'VERTICAL');
CMRE_LOG = renamevars(CMRE_LOG,22, 'ALTITUDE');
CMRE_LOG = renamevars(CMRE_LOG,23, 'ALT_DATA');
CMRE_LOG = renamevars(CMRE_LOG,24, 'OWNED_TASKS');
CMRE_LOG = renamevars(CMRE_LOG,25, 'MISC2');
CMRE_LOG = renamevars(CMRE_LOG,26, 'CAPABILITIES');
CMRE_LOG = renamevars(CMRE_LOG,27, 'MISC3');
%% Data Processing
% The first data set that will be pulled is the CMRE_LOG.
    catl/cmre/cmre.alliance/STATUS : b'{"header": {"message_type": "STATUS", "source":
    "cmre.alliance", "time_sent": "2022-09-16T10:30:12.001130+00:00"}, "body": {"id":
    "cmre.alliance", "status": "BUSY", "location": {"horizontal": {"latitude": 38.432425,
    "longitude": -9.104578}, "vertical": {"altitude": 23.3}}, "owned_tasks": [ ], "capabilities":
    [ ]}}'
% The vital datasets are depicted below:
% TIME - Column 9 - 'time_sent: "2022-00-00T00:00:00.000000+00:00"},'
% LATITUDE - Column 18 - 'XX.XXXXX,'
% Longitude - Column 20 - '-X.XXXXXX},'
% Within the function below the time needs to be the following format to
% ensure it can be ingested by STK '1 Jan 2021 00:00:00.000'
Processed_Lat = zeros(size(CMRE_LOG,1),1);
Processed_Long = zeros(size(CMRE_LOG,1),1);
Processed_Alt = zeros(size(CMRE_LOG,1),1);
for i=1:1:size(CMRE_LOG,1)
Processed_Lat(i,1)=str2num(CMRE_LOG.LAT_DATA{i}(1:end-1));
Processed_Long(i,1)=str2num(CMRE_LOG.LONG_DATA{i}(1:end-2));
Processed_Time{i,1}=(CMRE_LOG.TIME{i}(1:end-2));
Processed_Alt(i,1)=str2num(CMRE_LOG.ALT_DATA{i}(1:end-3));
Final_Time{i,1} = strcat('16 Sep 2022',{''}, Processed_Time{i,1}(12:23));
TEST_TIME{i,1} =Processed_Time{i,1}(12:23);
end
Processed_Lat = Processed_Lat';
Processed_Long = Processed_Long';
Processed_Alt = (Processed_Alt'./10000);
Final_Time = Final_Time';
time = 0
for t=1:1:size(CMRE_LOG,1)
  if t==1
    time(1,t) = time;
  else
    time(1,t) = time(1,t-1) +.3;
  end
end
CMRE_SHIP = AddShip('catl_CMRE')
[Confirmation] = RouteGreatArcTime(CMRE_SHIP,Processed_Lat,...
  Processed_Long,Processed_Alt,'M',time);
% ##########################################################################
% The second data set that will be pulled is the ITA_LOG.
    catl/ita_navy/ita_navy.asv300/STATUS: b'{"header": {"message_type": "STATUS",
    "source": "ita_navy.c2sxmus", "time_sent": "2022-09-16T10:30:39.401661+00:00"}, "body":
    {"id": "ita_navy.asv300", "status": "BUSY", "location": {"latitude": 38.355771, "longitude":
    -9.051305}, "capabilities": [ ], "owned_tasks": [ ]}}'
% The vital datasets are depicted below:
% TIME - Column 9 - 'time_sent: "2022-00-00T00:00:00.000000+00:00"},'
% LATITUDE - Column 18 - 'XX.XXXXX,'
% Longitude - Column 20 - '-X.XXXXXX},'
% Within the function below the time needs to be the following format to
% ensure it can be ingested by STK
Processed_Lat_ITA = zeros(size(ITA_LOG,1),1);
Processed_Long_ITA = zeros(size(ITA_LOG,1),1);
Processed_Alt_ITA = zeros(size(ITA_LOG,1),1);
for i=1:1:size(ITA_LOG,1)
Processed_Lat_ITA(i,1)=str2num(ITA_LOG.LATITUDE_DATA{i}(1:end-1));
Processed_Long_ITA(i,1)=str2num(ITA_LOG.LONGITUDE_DATA{i}(1:end-2));
Processed_Time_ITA{i,1}=(ITA_LOG.TIME_DATA{i}(1:end-2));
Final_Time_ITA{i,1} = strcat('16 Sep 2022', {''}, Processed_Time_ITA{i,1}(12:23));
TEST_TIME_ITA{i,1} =Processed_Time_ITA{i,1}(12:23);
end
Processed_Lat_ITA = Processed_Lat_ITA';
Processed_Long_ITA = Processed_Long_ITA';
Final_Time_ITA = Final_Time_ITA';
time_ITA = 0
for t=1:1:size(ITA_LOG,1)
  if t==1
    time_ITA(1,t) = time_ITA;
  else
    time_ITA(1,t) = time_ITA(1,t-1) +.3;
```

TABLE 2-continued

```
  end
end
ITA_SHIP = AddShip('catl_ita_navy3')
[Confirmation] = RouteGreatArcTime(ITA_SHIP,Processed_Lat_ITA,...
  Processed_Long_ITA,Processed_Alt_ITA','M',time_ITA);
```

The above-described methodology and processes are different from current approaches because known MQTT brokers do not provide mechanisms to save any of the messages that are sent across the network using the Machine to Machine (M2M) network protocol into the MQTT broker. There are known technical capabilities that reroute the information to a SQL database, but this still requires a user to download, parse, clean, and sort the data for processing by the M&S tool suite. The methodology described herein provides tools to collect, parse, clean, and create files that can be ingested easily by M&S tools without rerouting to another external database, such as is illustrated by data flow 106 in FIG. 1, for example.

Figure 2:
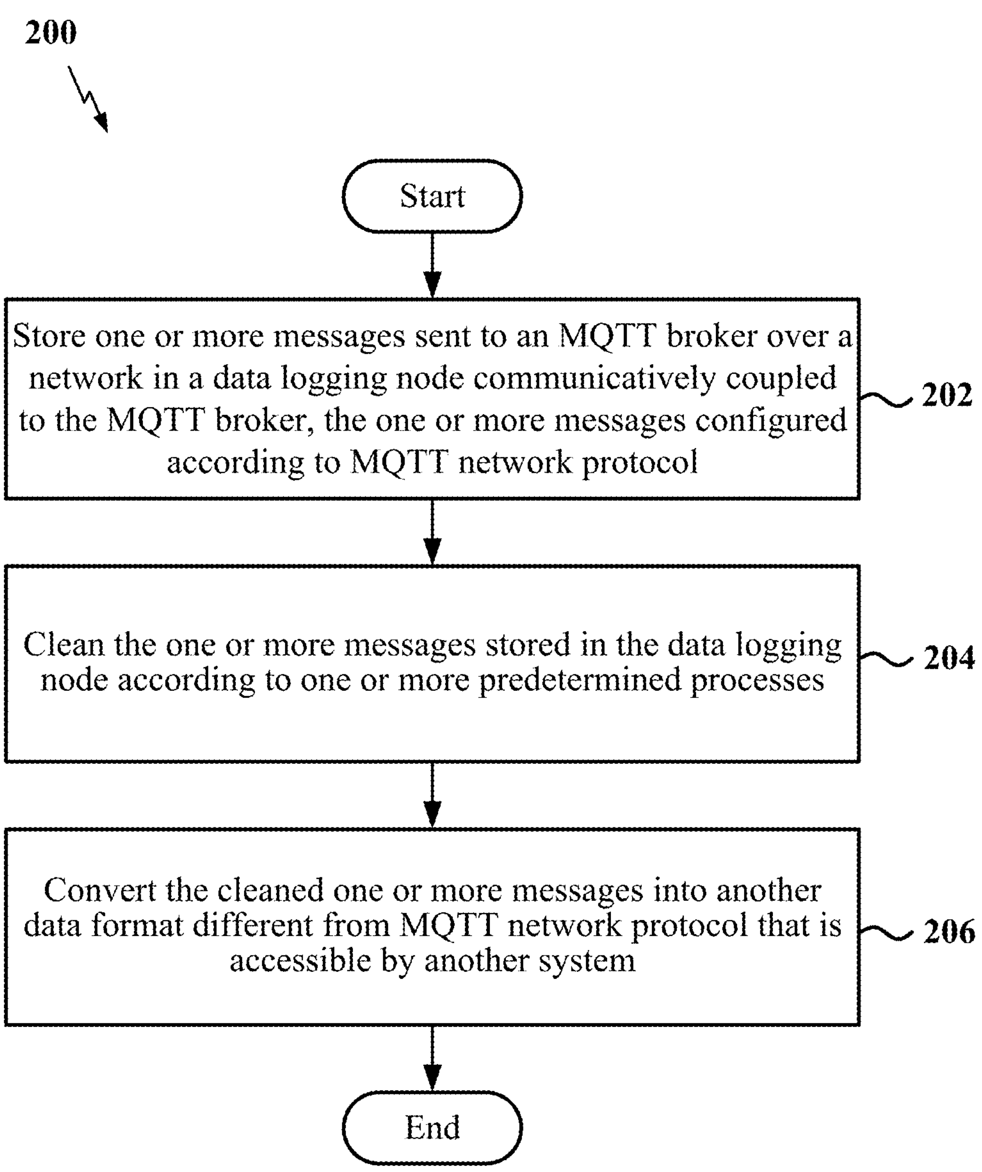
FIG. 2 illustrates flow diagram of a method according to aspects of the present disclosure.

FIG. 2 illustrates flow diagram of a method 200 according to aspects of the present disclosure. In particular, method 200 is a method for MQ Telemetry Transport (MQTT) data logging and processing including storing one or more messages sent to an MQTT broker over a machine-to-machine (M2M) network in a data logging node communicatively coupled to the MQTT broker, the one or more messages configured according to MQTT network protocol as shown in block 202. Further, method 200 includes cleaning the one or more messages stored in the data logging node according to one or more predetermined processes as shown in block 204. Moreover, method 200 includes converting the cleaned one or more messages into another data format different from MQTT network protocol that is accessible by another system as illustrated at block 206.

In further aspects, method 200 includes cleaning the one or more stored messages through sorting the one or more messages stored in the data logging node with a first message sorter (e.g., 110 in FIG. 1), and generating a file for at least a second message sorter and a file assignment module (e.g., 116 in FIG. 1). Further, wherein method 200 includes cleaning the one or more stored messages according to one or more predetermined processes by parsing both uniform and non-uniform messages of the one or more messages (i.e., the present apparatus and methodology is able to handle/sort/parse non-uniform messages in addition to normal uniform messages), and sorting the one or more stored messages based on respective header information of each message of the one or more stored messages. Additionally, it is noted that cleaning the one or more messages according to one or more predetermined processes comprises scanning through each of the one or messages for not a number (NaN), infinites (INFs), and Zeros and correcting instances of found NaN, INFs and Zeros.

Further, it is noted that the MQTT broker may be configured to listen to all messages flowing into the MQTT broker and configured to subscribe to all data streams related to the messages flowing into the MQTT broker. In other aspects, the MQTT messages are configured according to a Machine to Machine (M2M) network protocol and the M2M network protocol includes both encrypted and unencrypted M2M network protocols. In other aspects, the another system shown in block 206 may be a modeling and simulation (M&S) tool such as a digital mission engineering (DME) tool. In yet other aspects, the one or more messages in method 200 comprise one or more of Extensible Markup Language (XML) and JavaScript Object Notation (JSON) messages.

In other aspects, method 200 may include that the storing or logging process includes communicatively coupling the data logging node with the MQTT broker, sorting the stored/logged data and/or messages with a message sorter, and generating a file for a further message sorter and file assignment module. Method 200 also includes subscribing to a Machine to Machine (M2M) network protocol related to the MQTT broker for storing/logging data and/or messages sent to the MQTT broker, wherein the another system comprises a modeling and simulation (M&S) tool. In aspects, the M&S tool comprises a digital mission engineering (DME) tool/process. Further, the method 200 may be executed using the data logging node/module (See e.g., 414, and/or 402 in FIG. 4), including one or more of a data flow module for storing and sorting and a message sorter module.

Figure 3:
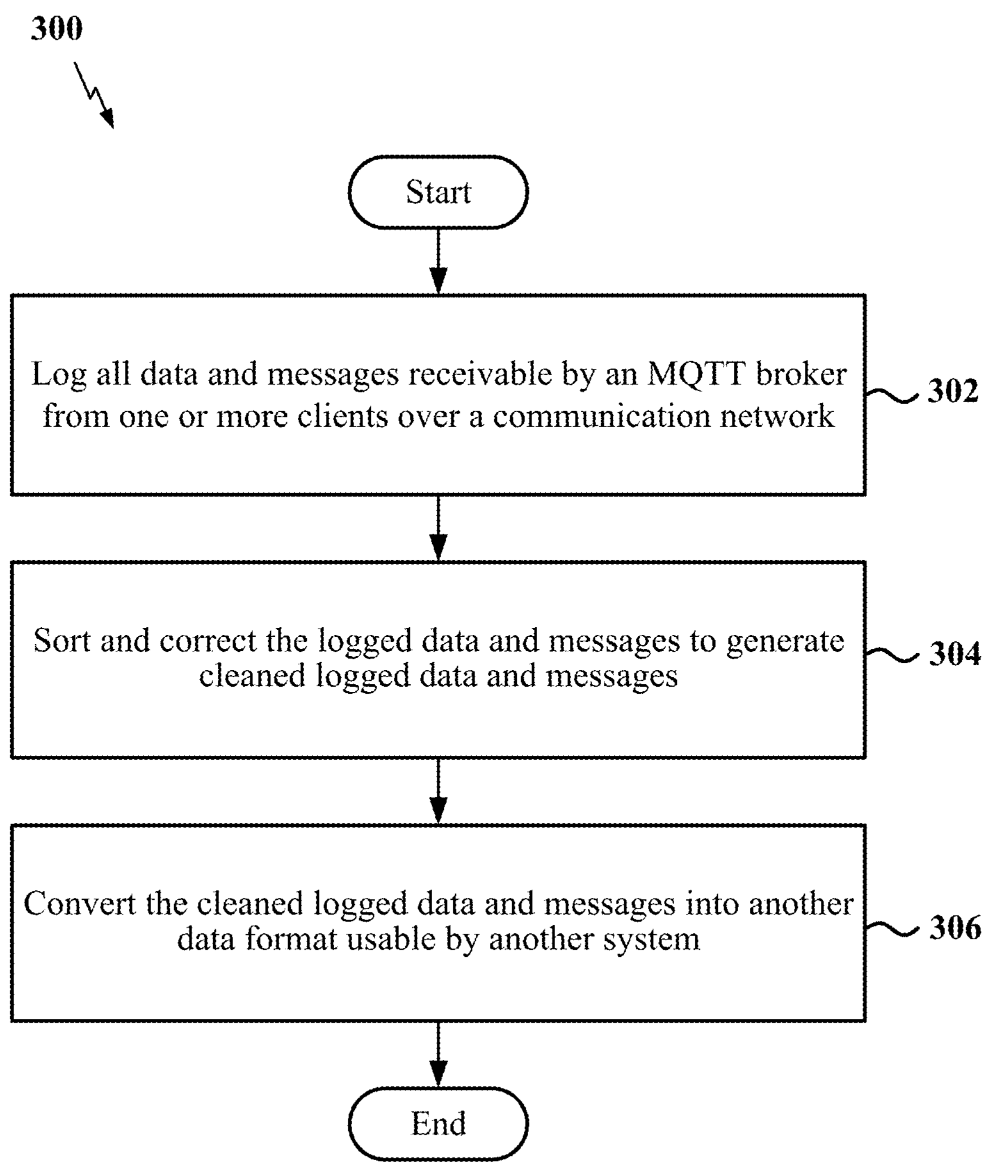
FIG. 3 illustrates flow diagram of a method according to aspects of the present disclosure.

FIG. 3 illustrates flow diagram of another exemplary method 300 according to aspects of the present disclosure for MQ Telemetry Transport (MQTT) data logging and processing comprising. As shown, method 300 includes logging all data and messages receivable by an MQTT broker from one or more clients over a communication network as shown in block 302. Further, method 300 includes sorting and correcting the logged data and messages to generate cleaned logged data and messages as illustrated by block 304. Finally, method 300 includes converting the cleaned logged data and messages into another data format usable by another system as shown in block 306.

Figure 4:
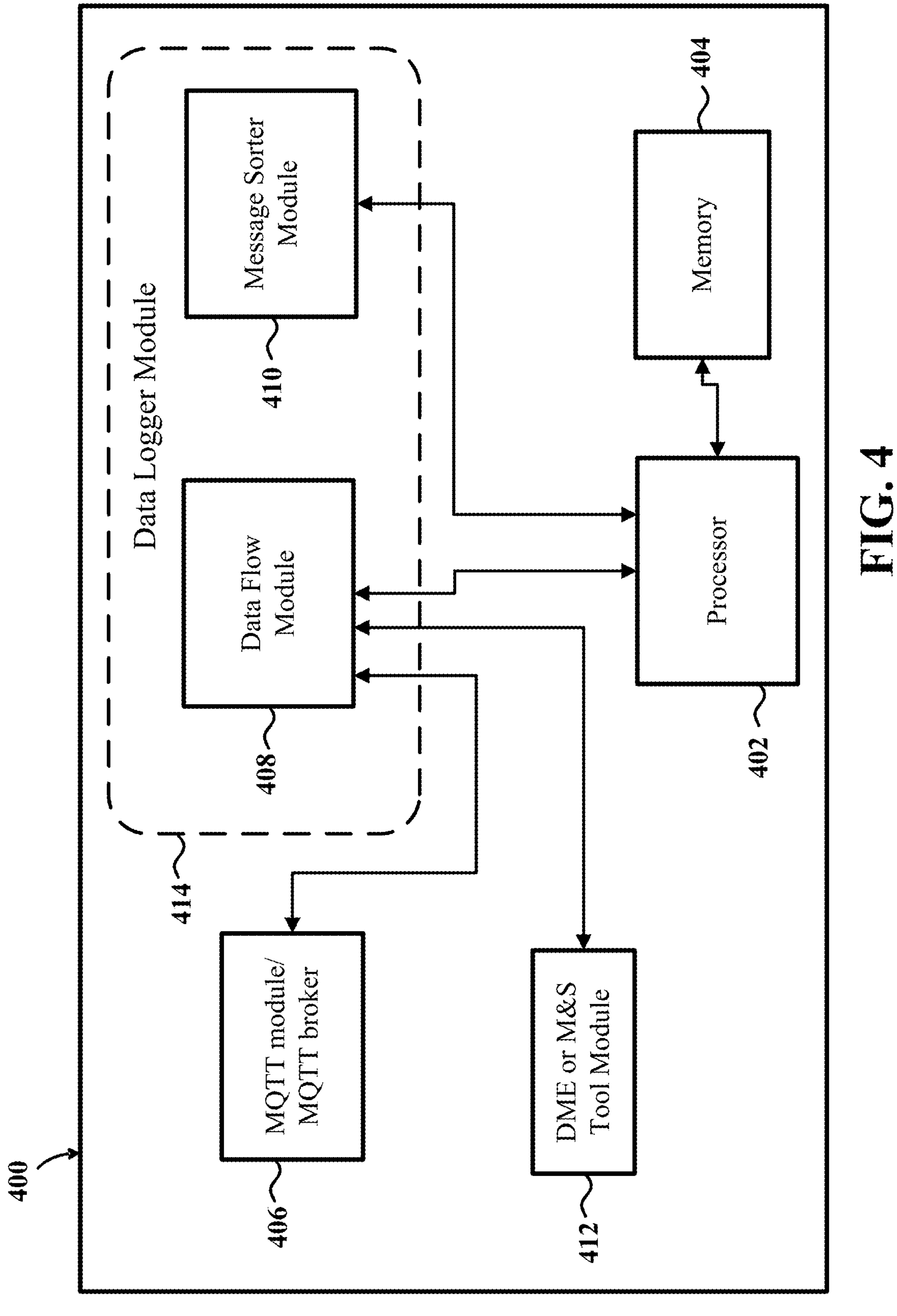
FIG. 4 illustrates an exemplary system diagram according to aspects of the present disclosure.

According to further aspects, method 300 includes that the logging includes communicatively coupling a data logging node with the MQTT broker such as is illustrated in the apparatus of FIG. 1 or FIG. 4.

Moreover, method 300 may include that the MQTT broker is configured to listen to all messages flowing into the MQTT broker and also configured to subscribe to all data streams related to the messages flowing into the MQTT broker. In yet further aspects, method 300 includes sorting and correcting the logged data and messages by sorting the logged data and messages with a message sorter, correcting instances of not a number (NaN), infinites (INFs), and Zeros found in the logged data and messages; and then generating a file containing the sorted and corrected logged data and messages with the message sorter for use in a further message sorter and file assignment module.

Method 300 may also include subscribing to a Machine to Machine (M2M) network protocol related to the MQTT broker for storing/logging data and/or messages sent to the MQTT broker, wherein the "another" system comprises a modeling and simulation (M&S) tool. In aspects, the M&S tool comprises a digital mission engineering (DME) tool/process.

FIG. 4 illustrates an exemplary apparatus or system diagram 400 according to aspects of the present disclosure. The system may include at least one processor 402 and communicatively coupled memory device and/or computer readable medium 404. Furthermore, the apparatus 400 may include (internal or external) an MQTT broker/module 406, a data logger module 414 including a data flow module 408 (akin to parts in FIG. 1) and message sorter module 410 (akin to parts shown in FIG. 1). Further, the apparatus/system 400 may include another system such as DME or similar M&S tool/software 412.

In other aspects, apparatus 400 may comprise an apparatus for MQ Telemetry Transport (MQTT) data logging and processing including a processor coupled to at least one memory device, a first module configured for storing/logging all data and/or messages sent to an MQTT broker (e.g., 408 and/or 414), a second module configured for cleaning the stored/logged data and/or messages (e.g., 408 and/or 410), and a third module configured for converting/placing the cleaned stored/logged data and/or messages into another data format accessible/usable by another system (e.g., 410 and/or 412).

In further aspects, FIG. 4 illustrates that the apparatus 400 for MQ Telemetry Transport (MQTT) data logging may include that the at least one processor 400 is integrated. In other aspects, however, a portion or all of processing resources may be external to the system 400. The apparatus 400 may also include the data logger module 414 coupled with the processor 402 and the MQTT module or broker 406. As illustrated, the data logger module 414 may include data flow module 408 configured to store one or more messages sent to the MQTT broker 406 over a machine-to-machine (M2M) network, wherein the one or more messages are configured according to MQTT network protocol. Additionally, the data logger module 414 is shown including message sorter module 410, which may be further configured to sort and clean the one or more messages stored in the data logging node according to one or more predetermined processes. In aspects, these one or more predetermined processes effected by module 410 may include parsing uniform and non-uniform messages of the one or more messages and sorting the one or more stored messages based on respective header information of each message of the one or more stored messages.

In further aspects, the data logger module 414 is further configured to convert the cleaned one or more messages into another data format different from MQTT network protocol that is accessible by another system. The apparatus 400 is configured to subscribe to a Machine to Machine (M2M) network protocol related to the MQTT broker for logging the one or more messages sent to the MQTT broker. In yet other aspects, the “another” system comprises a modeling and simulation (M&S) tool including a digital mission engineering (DME) tool.

In further aspects, it is noted that the processor 402 and/or data logger 414 in FIG. 4 may be configured for managing and executing general processing, including the execution of software stored on the computer-readable medium 404. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 402, causes the processing system 400 to perform the various functions described above for any particular apparatus. The computer-readable medium and/or memory 404 may also be used for storing data that is manipulated by the processor 402 when executing software.

The computer-readable medium 404 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 404 may reside in the processor 402 and/or modules 414 and/or 412, external to the processor 402 or modules 414 and/or 412, or distributed across multiple entities including the system 400. The computer-readable medium 404 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system. In some further aspects, the computer-readable medium such as 404 contains instructions that may cause the processor 402 and/or modules 414 and/or 412 to implement the methods as described herein including the methods described above in connection with FIGS. 1-4.

Although the presently disclosed invention has been described in detail with reference to certain embodiments or examples, variations and modifications exist within the spirit and scope of the invention as described herein and as defined in the following claims.

The invention claimed is:

1. A method for message queue telemetry transport (MQTT) data logging and processing comprising:

storing one or more messages sent to an MQTT broker over a machine-to-machine (M2M) network in a data logging node communicatively coupled to the MQTT broker, the one or more messages configured according to MQTT network protocol;

cleaning the one or more messages stored in the data logging node according to one or more predetermined processes including parsing uniform and non-uniform messages of the one or more messages, sorting the one or more messages stored in the data logging node with a first message sorter including sorting the one or more stored messages based on respective header information of each message of the one or more stored messages, and generating a file for at least a second message sorter and a file assignment module; and converting the cleaned one or more messages into another data format different from MQTT network protocol that is accessible by another system.

2. The method of claim 1, wherein cleaning the one or more messages according to one or more predetermined processes comprises scanning through each of the one or messages for not a number (NaN), infinites (INFs), and Zeros and correcting instances of found NaN, INFs and Zeros.

3. The method of claim 1, further comprising:

the MQTT broker configured to listen to all messages flowing into the MQTT broker and configured to subscribe to all data streams related to the messages flowing into the MQTT broker.

4. The method of claim 1, wherein the MQTT messages are configured according to a Machine to Machine (M2M) network protocol.

5. The method of claim 4, wherein the M2M network protocol includes both encrypted and unencrypted M2M network protocols.

6. The method of claim 1, wherein the another system is a modeling and simulation (M&S) tool.

7. The method of claim 6, wherein the M&S tool is a digital mission engineering (DME) tool.

8. The method of claim 1, wherein the one or more messages comprise one or more of Extensible Markup Language (XML) and JavaScript Object Notation (JSON) messages.

9. A method for MQ Telemetry Transport (MQTT) data logging and processing comprising:

logging all data and messages receivable by an MQTT broker from one or more clients over a communication network;

sorting and correcting the logged data and messages to generate cleaned logged data and messages; and converting the cleaned logged data and messages into another data format usable by another system;

wherein sorting and correcting the logged data and messages further comprises:

sorting the logged data and messages with a message sorter;

correcting instances of not a number (NaN), infinites (INFs), and Zeros found in the logged data and messages; and generating a file containing the sorted and corrected logged data and messages with the message sorter for use in a further message sorter and file assignment module.

10. The method of claim 9, wherein logging includes communicatively coupling a data logging node with the MQTT broker.

11. The method of claim 9, further comprising:

the MQTT broker configured to listen to all messages flowing into the MQTT broker and configured to subscribe to all data streams related to the messages flowing into the MQTT broker.

12. The method of claim 9, wherein the another system comprises a modeling and simulation (M&S) tool.

13. The method of claim 12, wherein the M&S tool comprises a digital mission engineering (DME) tool/process.

14. An apparatus for MQ Telemetry Transport (MQTT) data logging and processing comprising:

a processor coupled to at least one memory device;

a data logger module coupled with the processor and an MQTT broker, the data logger module including:

a data flow module configured to store one or more messages sent to the MQTT broker over a machine-to-machine (M2M) network, wherein the one or more messages are configured according to MQTT network protocol; and a message sorter module configured to sort and clean the one or more messages stored in the data logging node according to one or more predetermined processes;

wherein the data logger module is further configured to convert the cleaned one or more messages into another data format different from MQTT network protocol that is accessible by another system; and wherein the message sorter module is further configured to correct instances of not a number (NaN), infinites (INFs), and Zeros found in the logged data and messages, and generate a file containing the sorted and corrected logged data and messages with the message sorter for use in a further message sorter and file assignment module.

15. The apparatus of claim 14, wherein the apparatus is configured to subscribe to a Machine to Machine (M2M) network protocol related to the MQTT broker for logging the one or more messages sent to the MQTT broker.

16. The apparatus of claim 14, wherein the another system comprises a modeling and simulation (M&S) tool including a digital mission engineering (DME) tool.

17. A non-transitory computer-readable medium storing computer executable code, wherein the code when executed by at least one processor causes the at least one processor to:

store one or more messages sent to an MQTT broker over a network, the one or more messages configured according to MQTT network protocol;

clean the one or more stored messages according to one or more predetermined processes including correcting instances of not a number (NaN), infinites (INFs), and Zeros found in the logged data and messages, and generating a file containing the sorted and corrected logged data and messages with the message sorter for use in a further message sorter and file assignment module; and convert the cleaned one or more stored messages into another data format apart from MQTT network protocol that is accessible by another system.

* * * * *